(12) United States Patent
Segal et al.

(10) Patent No.: US 7,165,042 B1
(45) Date of Patent: *Jan. 16, 2007

(54) INTERACTIVE INTERNET ANALYSIS METHOD

(75) Inventors: Gilbert A. Segal, Hockessin, DE (US); Ernest H. Zerenner, Wilmington, DE (US)

(73) Assignee: Power Financial Group, Inc., Hockessen, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,205

(22) Filed: Mar. 13, 2000

Related U.S. Application Data

(63) Continuation of application No. 09/086,738, filed on May 29, 1998, now Pat. No. 6,049,783.

(60) Provisional application No. 60/055,403, filed on Aug. 8, 1997.

(51) Int. Cl.
*G06Q 40/00* (2006.01)

(52) U.S. Cl. .......................................... 705/36; 705/35

(58) Field of Classification Search ................. 705/36, 705/35
See application file for complete search history.

(56) References Cited

U.S. PATENT DOCUMENTS

| | | | | |
|---|---|---|---|---|
| 5,414,838 | A * | 5/1995 | Kolton et al. ............. | 705/36 R |
| 5,784,696 | A * | 7/1998 | Melnikoff .................... | 705/36 |
| 5,862,223 | A * | 1/1999 | Walker et al. ................ | 705/50 |
| 5,918,217 | A * | 6/1999 | Maggioncalda et al. ...... | 705/36 |
| 5,978,778 | A * | 11/1999 | O'Shaughnessy ............ | 705/36 |
| 6,012,042 | A * | 1/2000 | Black .......................... | 705/36 |
| 6,021,397 | A * | 2/2000 | Jones .......................... | 705/36 |
| 6,058,378 | A * | 5/2000 | Clark et al. .................... | 705/37 |
| 6,317,726 | B1 * | 11/2001 | O'Shaughnessy ............ | 705/36 |
| 6,321,212 | B1 * | 11/2001 | Lange ......................... | 705/37 |
| 2001/0056392 | A1 * | 12/2001 | Daughtery, III .............. | 705/36 |

OTHER PUBLICATIONS

OptionFind.com, www.optionfind.com, © 1998 Productivity Systems, 3 pages.
OptionsNewsletter: Stock Options made Easy, http://www.optionsnewsletter.com, © QuoteMedia, 18 pages.
E*Trade-research from Investors, www.etrade.com, © 1997 E*Trade Securities, 7 pages.
INVESTools-Trusted Advice for Independent Investors, www.investools.com, © 2000, 4 pages.
Yahoo!Finance, www.yahoo.com, © 2000, 2 pages.
Hoovers Online, The Business Networks, www.hoovers.com, 2000, 1 page.
Covered Call Screening www.investorsmind.com, © 1996-2000 Investorsmind.com, 2 pages.
OptionsXpress-Option Screener, www.optionsxpress.com, ® 2000, 1 page.

(Continued)

*Primary Examiner*—Alain L. Bashore
(74) *Attorney, Agent, or Firm*—Woodcock Washburn LLP

(57) ABSTRACT

A client establishes and/or modifies an interactive account on a server via proprietary sorting and filtering and reporting criteria as a means for timely processing of online financial data and/or other business information to retrieve valuations, sorted lists, etc. The method involves establishing a link with a server preset and programmable with client criteria for investment or decision making, acquiring data, sorting, filtering, etc.

63 Claims, 2 Drawing Sheets

OTHER PUBLICATIONS

Merrill Lynch- www.newmlol.com, © 2001, 15 pages.

Your Finance Resource, www.investmentdiscovery.com, 2006, 2 pages.

www.optionsearcher.com, © 2001-2006 OptionSearcher.com, 5 pages.

Optionetics.com: An Investment Education Resource for Stock and Options Traders, www.optionetics.com, © 1995-2006, 19 pages.

OptionMonitor, Your Source for Covered Call Option Data and Analysis, www.optionmonitor.com, © 2001-2006 Option Review, Inc., 10 pages.

www.msn.com, Home page, 2006 © Microsoft, 13 pages.

Financial Planning and Small Business Software for Individuals-Official Quicken Site, http://quicken.intuit.com, © 2006 Intuit, Inc., 10 pages.

Carey, T.W., "Calls of the Mild", *Barron's Technology Week,* Apr. 29, 2002, 1 page.

OptionFind.com, www.optionfind.com, Feb. 24, 2000, 6 pages.

OptionsXpress-Option Screener, www.optionsxpress.com, Oct. 3, 2005, 4 pages.

\* cited by examiner

INTERACTIVE INTERNET ANALYSIS METHOD

"This Application: is a continuation of U.S. provisional application Ser. No. 09/086,738 filed May 29, 1998, now U.S. Pat. No. 6,049,783 which, in turn, claims benefit of U.S. Provisional application Ser. No. 60/055,403, filed Aug. 8, 1997.

FIELD OF THE INVENTION

The invention relates to a method for making investment choices. In particular the invention relates to a method of filtering and sorting online financial data within a server to meet user criteria and format.

BACKGROUND OF THE INVENTION

U.S. Pat. No. 4,823,265 disclosed a means for automated renewal of options until a designated event occurs. U.S. Pat. No. 4,334,270 disclosed a method for using a digital computer to update securities information of multiple accounts. U.S. Pat. Nos. 4,674,044; 5,297,031; 5,347,452 deal with computer methods and visual displays for stock market brokers. From U.S. Pat. Nos. 4,209,845; 4,611,280; 5,218,700; 5,260,999 and 5,630,123 it was known to use software filtering and sorting to produce lists and locate specific data records. U.S. Pat. Nos. 5,262,942 and 5,270,922 provide data processing systems to serve the special needs of major investment firms.

Yet in spite of the technological advances made to meet the needs of stock brokers and investment firms, the prior art contained no suggestion of how the individual investor's needs could be met with regard to processing financial data according to individualized criteria. For the individual investor the task of matching individual criteria, once the data was retrieved or accessed in the published media, could require many hours, where over 2,700 stocks and over 40,000 options were involved.

SUMMARY OF THE INVENTION

It is the object of the invention to provide an interactive method via an Internet server for timely processing of data to meet the criteria of individual clients. This criteria can be easily changed to allow these clients the ability to request many variations of the data based on their individual needs. It is a further objective to provide quality results with improved speed of referral compared to existing business and financial systems.

THE METHOD OF THE INVENTION INCLUDES THE STEPS establishing a data filtering and sorting system for accounts within a server;

configuring the server to allow a client to interact with a database on the server;

setting and modifying upon request filtering and sorting and reporting criteria; and providing timely access to online data as a means for filtering and sorting and reporting.

DETAILED DESCRIPTION OF THE INVENTION

The problem with existing software dealing with stocks, stock options, futures, etc. was that it was devoted to meeting the needs of brokers and other professionals. Prior to the present invention there was no means available whereby the individual investor could make use of the speed of the computer in the same way as the investment professionals. Investment data is presented to individuals in a read only format with the content being very generic in nature. This invention gives these individual investors the ability to interact with a database in order to extract information, which is tailored to their individual needs. Individual criteria can be inputted and changed to explore different scenarios.

DETAILED DESCRIPTION OF THE DRAWINGS

Figure 1:
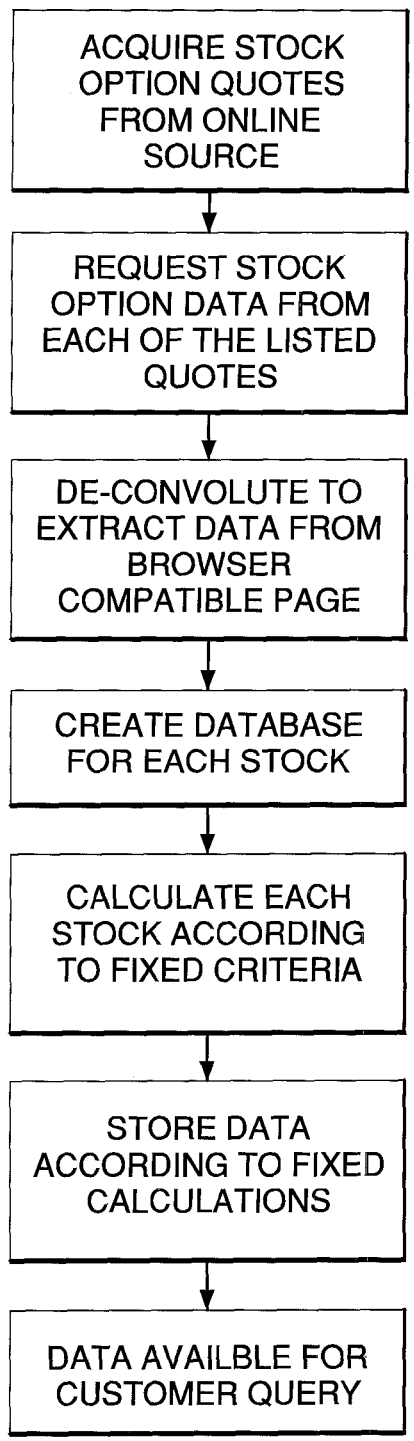
FIG. 1 The steps involved with acquiring the data and its storage on a server are illustrated in a flow diagram.

FIG. 1 Thousands of data items involving stocks and stock options are acquired from the Internet or other data source. These data items are sequentially processed to extract information of interest and further processed into a database one item at a time. Using stored fixed criteria and algorithms the database is created by calculation and made available for client query.

Figure 2:
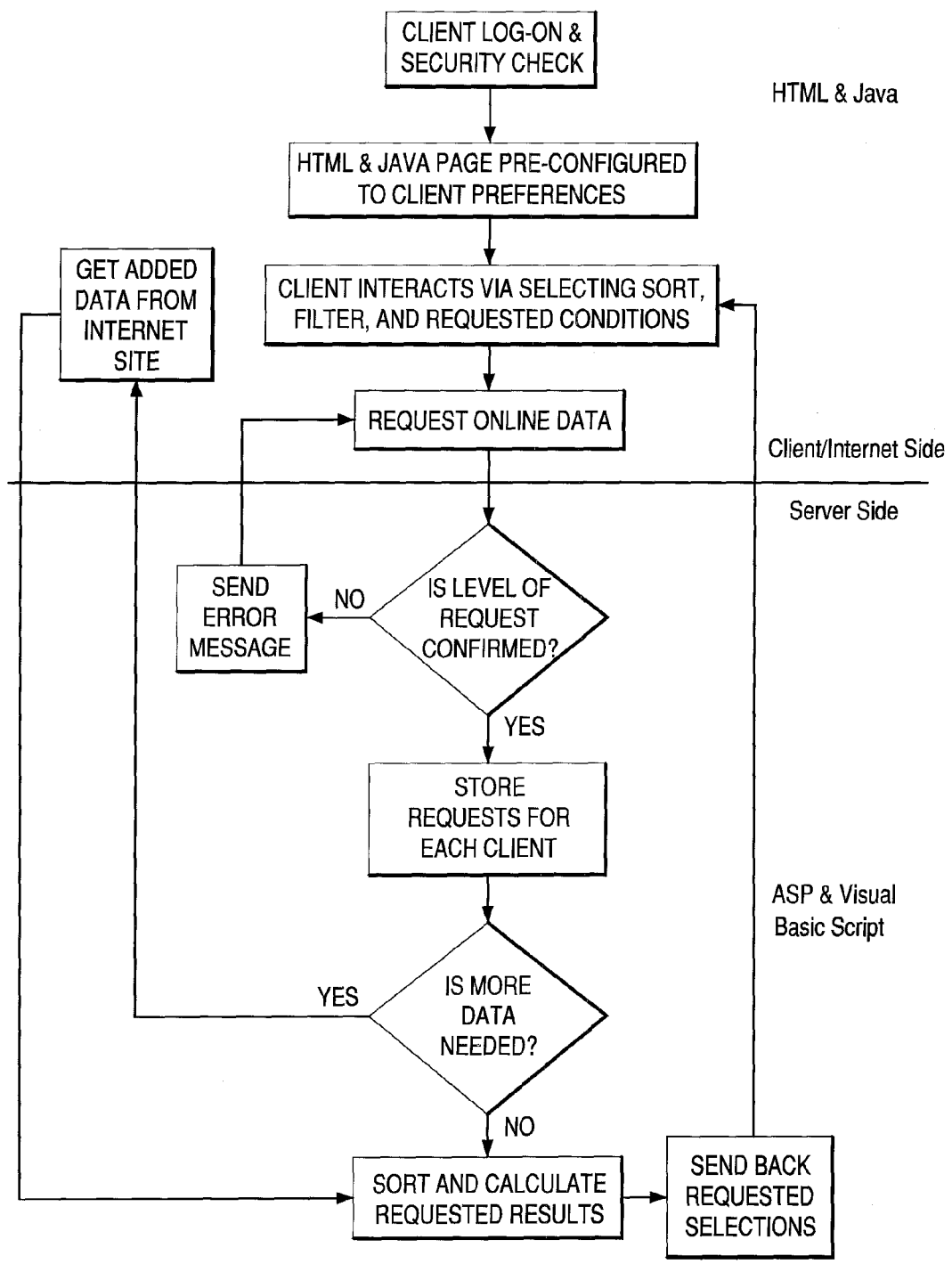
FIG. 2 The steps involved with a multi-task account on a server, which can be queried by the individual investor, are illustrated in a flow diagram.

FIG. 2 In the drawing all functions below the dotted line take place within a server, whereas the functions above the line require interaction of the client to configure and/or reconfigure processing within the server. Sequentially the client logs on and after a security check has the option to use preconfigured parameters or can modify filtering and sorting parameters. Within the server the request for data is checked to confirm subscription level according to the subscriber price paid for by the client. If the level does not exceed what has been paid for the request is stored, processed, assorted and calculated with provision for obtaining more Internet data if required. The requested selections are finally sent back to the client according to the criteria specified. Data acquisition and program languages are not limited to the ones illustrated in FIG. 2:

The following definitions pertain to the Figures and Preparations and Examples which serve to illustrate the practice of the invention without being limiting.

| | |
|---|---|
| Browser | A Client side program that retrieves World Wide Web pages and displays them to the user. |
| HTML | HyperText Markup Language - This is the standard language used by Internet Browsers for describing the contents and structure of pages on the World Wide Web. |
| JAVA | A general-purpose programming language developed by Sun Microsystems Inc. |
| ASP | Active Server Page - Server side language developed by Microsoft Inc. for NT servers. |
| NT | A computer operating system developed by Microsoft Inc. |
| VB Script | Visual Basic Script - An interpretive language developed by Microsoft Inc. |
| Server | A Computer that offers services on a network. On the World Wide Web, the server is the computer that runs the Web server program. |
| De-convolute | Extraction of data to present it in a different format. |
| Level | The difference in subscriber capability is based on the price of the subscription. |
| Black-Scholes | A mathematical formula used to calculate an option's |

-continued theoretical value from the following inputs: stock
price, strike price, interest rates, dividends,
time to expiration, and volatility.

Preparation A

A software program for a server to use fixed and variable user criteria for a security account was coded wherein analysis of stock option data produces valuations and sorted lists from over two thousand stocks listed on one or more exchanges. The data is downloaded from the Internet or other source either at the close or after a transaction. FIG. 1 provides a flow sheet for the first interactive server system to be evaluated and commercialized with both US and International Internet Clients.

Preparation B

A software program for a server capable of multi-function financial analysis for stocks, stock options, bonds, commodities, etc. was coded to provide for individual accounts to be established and maintained or modified and updated by means of investor criteria to set parameters for sorting, filtering, data selection, reports, etc. FIG. 2 provides a flow sheet for modifications and improvements to Preparation A resulting from requests of clients who required alternatives other than those pre-programmed.

EXAMPLE 1

A one month trial program with over 200 users was used to evaluate Preparation A for operational flaws and defects in coding. Following corrections and modifications a commercial system was established with each client paying a monthly fee of $29.95 US Dollars. One client was well pleased to obtain in just 15 minutes from a list of over 2,400 stocks, sorted options information, which previously took him more than 4 hours to calculate on a Saturday afternoon.

Table 1 contains the data obtained from a sort performed by the method:

TABLE 1

| Stock name | symbol | opt. symbol | strike | bid | vol. | open int. | not called | called |
|---|---|---|---|---|---|---|---|---|
| Check Point | CHKPF | KEQBG | Feb 12.5 | 3 ¾ | 69 | 109 | 11.2% | 15.7% |
| Yurie Sys. | YURI | YQIBX | Feb 22.5 | 2 ¾ | 20 | 81 | 12.1% | 10.7% |
| Marine Drll | MDCO | QDMBW | Feb 17.5 | 1 15/16 | 417 | 604 | 11.0% | 10.7% |

Table 2 contains the investor selected sorts needed to obtain the sorted list of Table 1.

TABLE 2

Spread less than 5
Not called % greater than 11
Called % greater than 10
Volume greater than 10
Open interest greater than 10
Stock price greater than 10 and less than 100
Both in the money and out of the money calls

EXAMPLE 2

A server system as per Preparation B will allow both individual investors and financial professionals to customize a proprietary account to process financial data and business information not limited to stock options.

The main advantage attributed to the inventive method as illustrated in FIG. 2 has been that the individual investor has been free to experiment with investment scenarios rather than being forced to rely on the generic read only formats available from stock brokers and investment professionals who have invested in computer systems designed to give them maximum income for minimum services. Unless those individual investors had portfolios worth in excess of two million dollars, they were simply classified within one of the low profit categories. Then by entering this minimal information a broker or investment professional can deliver buy and sell investment choices, which will provide steady income regardless of developing better than average results.

We claim:

1. A method of identifying financial instruments meeting user-defined investment criteria, comprising the steps of:

receiving financial instrument data from at least one data source, said financial instrument data reflecting current market conditions;

calculating using the financial instrument data values for a plurality of searchable parameters for particular financial instruments in said financial instrument data;

creating accounts for users wishing to identify financial instruments;

receiving user-defined search criteria for said searchable parameters;

confirming that a user is authorized to request a search of the searchable parameters;

storing in relation to the accounts the user-defined criteria for searching the searchable parameters;

comparing the user-defined search criteria with the values identified for the searchable parameters for the particular financial instruments;

identifying at least one of the financial instruments having values for the searchable parameters matching the user-defined search criteria;

transmitting to the user for display data identifying at least one of the financial instruments having values for the searchable parameters matching the user-defined search criteria;

receiving modified user-defined search criteria for said searchable parameters;

comparing the modified user-defined search criteria with the values identified for the searchable parameters for the particular financial instruments;

identifying at least one of the financial instruments having values for the searchable parameters matching the modified user-defined search criteria; and transmitting to the user for display data identifying at least one of the financial instruments having values for the searchable parameters matching the modified user-defined search criteria.

2. The method of claim 1, wherein the financial instruments are stock options.

3. The method of claim 1, wherein the financial instruments are stocks.

4. The method of claim 1, wherein the financial instruments are bonds.

5. The method of claim 1, wherein the financial instruments are commodities.

6. The method of claim 1, wherein said step of calculating data values for the searchable parameters from the financial instrument data comprises the step of calculating values for at least one of the following search parameters: Black-Scholes value, percent if called, percent if not called, in the money, out of the money, volatility, earnings change, and spread between called and not called.

7. The method of claim 1, wherein the step of comparing the user-defined search criteria with the values identified for the searchable parameters comprises the step of searching financial instrument data comprising at least one of the following: open interest; option month; spread between called and not called; price; volume; volatility; price earnings ratio; earnings change; percentage volume change; number of shares; range between high and low values; and put options.

8. The method of claim 1, wherein said step of confirming that a user is authorized to request a search of the searchable parameters comprises the step of confirming that a user has paid prior to executing a search of the searchable parameters.

9. The method of claim 1, wherein said step of confirming that a user is authorized to request a search of the searchable parameters comprises the step of confirming that a user has registered prior to executing a search of the searchable parameters.

10. The method of claim 1, wherein said user-defined search criteria comprises at least one range of values for said searchable parameters.

11. The method of claim 10, wherein said at least one range of values comprises a maximum value and a minimum value.

12. The method of claim 10, wherein said at least one range of values comprises values greater than a user-defined value.

13. The method of claim 10, wherein said at least one range of values comprises values less than a user-defined value.

14. The method of claim 10, wherein said at least one range of values comprises a range of percentages.

15. The method of claim 1, wherein said step of accepting user-defined search criteria for said searchable parameters comprises the step of receiving user-defined search criteria over the Internet.

16. The method of claim 15, comprising the further step of accepting user-defined search criteria formatted by a Web browser.

17. The method of claim 1, wherein the step of identifying a set of financial instruments comprises the step of transmitting data identifying a set of financial instruments across the Internet to the user.

18. The method of claim 17, further comprising the step of formatting the data identifying the set of financial instruments for receipt by a Web browser.

19. The method of claim 1, further comprising the step of storing the values identified for the set of searchable parameters in a database.

20. A computer-readable medium comprising computer-executable instructions for identifying financial instruments meeting user-defined investment criteria, the computer readable medium being readable by a computer to process the instructions to perform the following steps:
receiving financial instrument data from at least one data source, said financial instrument data reflecting current market conditions;
calculating using the financial instrument data values for a plurality of searchable parameters for particular financial instruments in said financial instrument data;
creating accounts for user wishing to identify financial instruments;
receiving user-defined search criteria for said searchable parameters;
confirming that a user is authorized to request a search of the searchable parameters;
storing in relation to the accounts at least one user-defined set of criteria for searching the searchable parameters;
comparing the user-defined search criteria with the values identified for the searchable parameters for the financial instruments having values matching the user-defined search criteria;
identifying at least one of the financial instruments having values for the searchable parameters matching the user-defined search criteria;
transmitting to the user for display data identifying at least one of the financial instruments having values for the searchable parameters matching the user-defined search criteria;
receiving modified user-defined search criteria for said searchable parameters;
comparing the modified user-defined search criteria with the values identified for the searchable parameters for the particular financial instruments;
identifying at least one of the financial instruments having values for the searchable parameters matching the modified user-defined search criteria; and
transmitting to the user for display data identifying at least one of the financial instruments having values for the searchable parameters matching the modified user-defined search criteria.

21. A method of providing financial to a user over a computer communications network, comprising the steps of:
receiving financial instrument data from at least one data source, said financial instrument data reflecting current market conditions;
calculating using the financial instrument data values for a plurality of searchable parameters for particular financial instruments in said financial instrument data;
creating a database of searchable data, said database comprising the calculated data values for a plurality of searchable parameters;
receiving user-defined search criteria via the computer communications network;
confirming that a user is authorized to request a search of the searchable parameters;
maintaining a database of user account information, said database of user account information comprising stored in relation to user accounts the user-defined criteria for searching the searchable parameters;
searching the database of searchable data for financial instruments having values for a plurality of searchable parameters that satisfy the user-defined search criteria;

returning a representation of at least one of the plurality of financial instruments having values for the searchable parameters satisfying the user-defined search criteria to the user over the computer communications network;

receiving modified user-defined search criteria via the computer communications network;

searching the database of searchable data for financial instruments having values for a plurality of searchable parameters that satisfy the modified user-defined search criteria;

returning a representation of a least one of the plurality of financial instruments having values for the searchable parameters satisfying the modified user-defined search criteria to the user over the computer communications network.

22. The method of claim 21, wherein the financial instrument data relates to stocks.

23. The method of claim 21, wherein the financial instrument data relates to stock options.

24. The method of claim 21, wherein the financial instrument data relates to bonds.

25. The method of claim 21, wherein the financial instrument data relates to commodities.

26. The method of claim 21, wherein said step of creating the database of searchable data from the financial instrument data comprises the step of calculating values for at least one of the following: Black-Scholes value, percent if called, percent if not called, in the money, out of the money, volatility, earnings change, and spread between called and not called.

27. The method of claim 21, wherein said step of searching the database of searchable data comprises the step of searching for defined values of at least one of the following data items: open interest; percent if called; percent if called; percent if not called; in the money; out of the money; option month; spread between called and not called; minimum and maximum search criteria; price; volume; volatility; Black-Scholes value; price earnings ratio; earnings change; percentage volume change; number of shares; range between high and low values; and put options.

28. The method of claim 21, wherein said step of confirming that a user is authorized to request a search of the searchable parameters comprises the step of confirming that a user has paid prior to executing a search of the searchable parameters.

29. The method of claim 21, wherein said step of confirming that a user is authorized to request a search of the searchable parameters comprises the step of confirming that a user has registered prior to executing a search of the searchable parameters.

30. A computer-readable medium comprising computer-executable instructions for identifying financial instruments meeting user-defined investment criteria, the computer readable medium being readable by a computer to process the instructions to perform the following steps:

receiving financial instrument data from at least one data source, said financial instrument data reflecting current market conditions;

calculating using the financial instrument data values for a plurality of searchable parameters for particular financial instruments in said financial instrument data;

creating a database of searchable data, said database comprising the calculated values for a plurality of searchable parameters;

receiving user-defined search criteria via the computer communications network;

confirming that a user is authorized to request a search of the searchable parameters;

maintaining a database of user account information, said database of user account information comprising stored in relation to user accounts the user-defined criteria for searching the searchable parameters;

searching the database of searchable data for financial instruments having values for a plurality of searchable parameters that satisfy the user-defined search criteria;

returning a representation of at least one of the plurality of financial instruments having values for the searchable parameters satisfying the user-defined search criteria to the user over the computer communications network;

receiving modified user-defined search criteria via the computer communications network;

searching the database of searchable data for financial instruments having values for a plurality of searchable parameters that satisfy the modified user-defined search criteria; and returning a representation of a least one of the plurality of financial instruments having values for the searchable parameters satisfying the modified user-defined search criteria to the user over the computer communications network.

31. A server system for searching for financial instruments, comprising:

a database; and executable computer instructions for performing the following:

requesting financial instrument data from at least one data source, said financial instrument data reflecting current market conditions;

receiving financial instrument data from at least one data source;

calculating using the financial instrument data values for a plurality of searchable parameters for particular financial instruments in said financial instrument data;

creating a database of financial instrument data from at least one data source;

creating a database of searchable data, said database comprising the calculated values for a plurality of searchable parameters;

receiving user-defined search criteria via the computer communications network;

confirming that a user is authorized to request a search of the searchable parameters;

maintaining a database of user account information, said database of user account information comprising stored in relation to user accounts the user-defined criteria for searching the searchable parameters;

searching the database of searchable data for financial instruments having values for a plurality of searchable parameters that satisfy the user-defined search criteria;

returning a representation of at least one of the plurality of financial instruments having values for the searchable parameters satisfying the user-defined search criteria to the user over the computer communications network;

receiving modified user-defined search criteria via the computer communications network;

searching the database of searchable data for financial instruments having values for a plurality of searchable parameters that satisfy the modified user-defined search criteria; and returning a representation of a least one of the plurality of financial instruments having values for the searchable parameters satisfying the modified user-defined search criteria to the user over the computer communications network.

32. The server system of claim 31, wherein the financial instruments are stock options.

33. The server system of claim 31, wherein the financial instruments are stocks.

34. The server system of claim 31, wherein the financial instruments are bonds.

35. The server system of claim 31, wherein the financial instruments are commodities.

36. The server system of claim 31, wherein said step of returning a representation of at least one of the plurality of financial instruments comprises transmitting a representation of the at least one of the plurality of financial instruments over the Internet.

37. The server system of claim 31, wherein said step of receiving user-defined search criteria comprises receiving the user-defined search criteria from the Internet.

38. A method of identifying financial instruments meeting user-defined investment criteria to a user, comprising the steps of:
   requesting financial instrument data from at least one data source, said financial instrument data reflecting current market conditions;
   presenting to a user a set of searchable parameters;
   accepting user-defined search criteria for said searchable parameters;
   transmitting the user-defined search criteria to a server for searching for financial instruments having values for the searchable parameters corresponding to the user-defined search criteria;
   confirming that a user is authorized to request a search of the searchable parameters;
   maintaining at the server a database of user account information, said database of user account information comprising stored in relation to user accounts the user-defined criteria for searching the searchable parameters;
   accepting from the server a set of financial instruments having values for the searchable parameters matching the user-defined search criteria;
   presenting to a user the set of financial instruments having values for the searchable parameters matching the user-defined search criteria;
   accepting modified user-defined search criteria for said searchable parameters;
   transmitting the modified user-defined search criteria to a server for searching for financial instruments having values for the searchable parameters corresponding to the user-defined search criteria;
   accepting from the server a set of financial instruments having values for the searchable parameters matching the modified user-defined search criteria; and
   presenting to a user the set of financial instruments having values for the searchable parameters matching the modified user-defined search criteria.

39. The method of claim 38, wherein the financial instruments are stock options.

40. The method of claim 38, wherein the financial instruments are stocks.

41. The method of claim 38, wherein the financial instruments are bonds.

42. The method of claim 38, wherein the financial instruments are commodities.

43. The method of claim 38, wherein the searchable parameters comprises at least one of the following: open interest; option month; spread between called and not called; price; volume; volatility; price earnings ratio; earnings change; percentage volume change; number of shares; range between high and low values; and put options.

44. The method of claim 38, comprising the further steps of:
   receiving from the user, data for establishing an account; and
   transmitting to the server, the data for establishing an account.

45. The method of claim 38, wherein said user-defined search criteria comprises at least one range of values for said searchable parameters.

46. The method of claim 45, wherein said at least one range of values comprises a maximum value and a minimum value.

47. The method of claim 45, wherein said at least one range of values comprises values greater than a user-defined value.

48. The method of claim 45, wherein said at least one range of values comprises values less than a user-defined value.

49. The method of claim 45, wherein said at least one range of values comprises a range of percentages.

50. The method of claim 38, wherein said step of transmitting the user-defined search criteria to a server comprises transmitting the user-defined search criteria over the Internet.

51. The method of claim 38, wherein said step of accepting from the server a set of financial instruments comprises receiving the set of financial instruments from the Internet.

52. The method of claim 38, wherein the user-defined search criteria has been formatted using a Web browser.

53. The method of claim 38, wherein the set of financial instruments is formatted for receipt by a Web browser.

54. A computer-readable medium comprising computer-executable instructions for identifying financial instruments meeting user-defined investment criteria, the computer readable medium being readable by a computer to process the instructions to perform steps comprising:
   requesting financial instrument data from at least one data source, said financial instrument data reflecting current market conditions;
   presenting to a user a set of searchable parameters;
   accepting user-defined search criteria for said searchable parameters;
   transmitting the user-defined search criteria to a server for searching for financial instruments having values for the searchable parameters corresponding to the user-defined search criteria;
   confirming that a user is authorized to request a search of the searchable parameters;
   maintaining at the server a database of user account information, said database of user account information comprising stored in relation to user accounts the user-defined criteria for searching the searchable parameters;
   accepting from the server a set of financial instruments having values for the searchable parameters matching the user-defined search criteria;

presenting to a user the set of financial instruments having values for the searchable parameters matching the user-defined search criteria;

accepting modified user-defined search criteria for said searchable parameters;

transmitting the modified user-defined search criteria to a server for searching for financial instruments having values for the searchable parameters corresponding to the user-defined search criteria;

accepting from the server a set of financial instruments having values for the searchable parameters matching the modified user-defined search criteria; and presenting to a user the set of financial instruments having values for the searchable parameters matching the modified user-defined search criteria.

55. The method of claim 2 wherein the step of receiving user-defined search criteria for said searchable parameters comprises the step of receiving user-defined search criteria for at least one of the following searchable parameters: spread between called and not called; percent if not called; percent if called; volume; open interest; stock price; in the money; and out of the money.

56. The method of claim 55, wherein the step of presenting to a user the set of financial instruments comprises the step of compiling a list of stock options, wherein the list identifies for each stock option at least one of the following: stock name; stock symbol; option symbol; strike month; strike price; bid; volume; open interest; percent if not called; and percent if called.

57. The method of claim 23 wherein the step of receiving user-defined search criteria comprises the step of receiving user-defined search criteria for at least one of the following searchable parameters: spread between called and not called; percent if not called; percent if called; volume; open interest; stock price; in the money; and out of the money.

58. The method of claim 57, wherein the step of returning a representation of at least one of the particular financial instruments comprises the step of returning a list of stock options, wherein the list identifies for each stock option at least one of the following: stock name; stock symbol; option symbol; strike month; strike price; bid; volume; open interest; percent if not called; and percent if called.

59. The method of claim 32 wherein the step of receiving user-defined search criteria comprises the step of receiving user-defined search criteria for at least one of the following searchable parameters: spread between called and not called; percent if not called; percent if called; volume; open interest; stock price; in the money; and out of the money.

60. The method of claim 59, wherein the step of returning a representation of at least one of the plurality of financial instruments comprises the step of returning a list of stock options, wherein the list identifies for each stock option at least one of the following: stock name; stock symbol; option symbol; strike month; strike price; bid; volume; open interest; percent if not called; and percent if called.

61. The method of claim 39 wherein the step of accepting user-defined search criteria for said searchable parameters comprises the step of accepting user-defined search criteria for at least one of the following searchable parameters: spread between called and not called; percent if not called; percent if called; volume; open interest; stock price; in the money; and out of the money.

62. The method of claim 61, wherein the step of presenting to a user the set of financial instruments comprises the step of presenting a list of stock options, wherein the list identifies for each stock option at least one of the following: stock name; stock symbol; option symbol; strike month; strike price; bid; volume; open interest; percent if not called; and percent if called.

63. The method of claim 1, further comprising creating a database of searchable data from the financial instrument data, said database comprising for financial instruments identified in the financial instrument data values for a plurality of searchable parameters, and wherein comparing the user-defined search criteria with the values identified for the searchable parameters for the particular financial instruments comprises searching the database of searchable data for financial instruments having values for a plurality of searchable parameters that satisfy the user-defined search criteria;

transmitting to the user for display data identifying at least one of the financial instruments having values for the searchable parameters matching the user-defined search criteria comprises returning a representation of at least one of the plurality of financial instruments having values for the searchable parameters satisfying the user-defined search criteria;

comparing the modified user-defined search criteria with the values identified for the searchable parameters for the particular financial instruments comprises searching the database of searchable data for financial instruments having values for a plurality of searchable parameters that satisfy the modified user-defined search criteria; and transmitting to the user for display data identifying at least one of the financial instruments having values for the searchable parameters matching the modified user-defined search criteria comprises returning a representation of at least one of the plurality of financial instruments having values for the searchable parameters satisfying the modified user-defined search criteria.

* * * * *